United States Patent
Muratani et al.

(10) Patent No.: US 12,338,134 B2
(45) Date of Patent: Jun. 24, 2025

(54) METHOD FOR PRODUCING COBALT FERRITE PARTICLES AND COBALT FERRITE PARTICLES PRODUCED BY SAME

(71) Applicant: NITTETSU MINING CO., LTD., Tokyo (JP)

(72) Inventors: Naoki Muratani, Kochi (JP); Tsubasa Arai, Tokyo (JP); Akira Kishimoto, Tokyo (JP)

(73) Assignee: NITTETSU MINING CO., LTD., Tokyo (JP)

( * ) Notice: Subject to any disclaimer, the term of this patent is extended or adjusted under 35 U.S.C. 154(b) by 758 days.

(21) Appl. No.: 17/604,608

(22) PCT Filed: Apr. 8, 2020

(86) PCT No.: PCT/JP2020/015761
§ 371 (c)(1),
(2) Date: Oct. 18, 2021

(87) PCT Pub. No.: WO2020/217982
PCT Pub. Date: Oct. 29, 2020

(65) Prior Publication Data
US 2022/0194813 A1    Jun. 23, 2022

(30) Foreign Application Priority Data

Apr. 25, 2019 (JP) .................................. 2019-083563

(51) Int. Cl.
C01G 51/04 (2025.01)
C09D 5/00 (2006.01)
(Continued)

(52) U.S. Cl.
CPC .............. *C01G 51/04* (2013.01); *C09D 5/00* (2013.01); *G03G 9/0833* (2013.01);
(Continued)

(58) Field of Classification Search
None
See application file for complete search history.

(56) References Cited

U.S. PATENT DOCUMENTS 3,822,210 A * 7/1974 Iwase ..................... C01B 13/363
   252/62.62
5,549,837 A * 8/1996 Ginder .................... H01F 1/447
   252/62.55

(Continued)

FOREIGN PATENT DOCUMENTS

CN    1234133 A    11/1999
CN    1777654 A    5/2006
(Continued)

OTHER PUBLICATIONS

JP-H02264967-A Translation (Year: 2024).*
JP-2007015871-A Translation (Year: 2024).*
JP H02264967 A (Year: 2024).*
JP-2007015871-A (Year: 2024).*
(Continued)

*Primary Examiner* — Mark F. Huff
*Assistant Examiner* — Charles Collins Sullivan, IV
(74) *Attorney, Agent, or Firm* — GREENBLUM & BERNSTEIN, P.L.C.

(57) ABSTRACT

Provided are magnetic particles (cobalt ferrite) having a micrometer-order average particle diameter and similar particle diameters. A cobalt ferrite precursor is heated in the presence of a sulfite, thereby obtaining intended cobalt ferrite magnetic particles.

6 Claims, 4 Drawing Sheets

(51) Int. Cl.
 *G03G 9/083* (2006.01)
 *H01F 1/11* (2006.01)
(52) U.S. Cl.
 CPC ......... *G03G 9/0834* (2013.01); *G03G 9/0837* (2013.01); *G03G 9/0838* (2013.01); *G03G 9/0839* (2013.01); *H01F 1/11* (2013.01); *C01P 2004/32* (2013.01); *C01P 2004/61* (2013.01); *C01P 2004/62* (2013.01); *C01P 2006/42* (2013.01)

(56) References Cited

U.S. PATENT DOCUMENTS

| | | | | |
|---|---|---|---|---|
| 5,911,905 | A | * | 6/1999 | Tokunaga .......... G11B 5/70689 |
| 2007/0184268 | A1 | * | 8/2007 | Kishimoto .............. C09C 3/063 |
| | | | | 427/212 |
| 2009/0170021 | A1 | * | 7/2009 | Kaya .................. G03G 9/09307 |
| | | | | 430/109.4 |
| 2017/0069344 | A1 | | 3/2017 | Hosoya et al. |

FOREIGN PATENT DOCUMENTS

| | | | |
|---|---|---|---|
| CN | 101774646 | | 7/2010 |
| CN | 104 332 625 | A | 2/2015 |
| CN | 106082349 | A | 11/2016 |
| CN | 109574087 | | 4/2019 |
| GB | 861902 | A * | 3/1961 |
| JP | 60-047722 | | 10/1985 |
| JP | H02264967 | A * | 10/1990 |
| JP | 03-024412 | | 4/1991 |
| JP | 05-027481 | | 2/1993 |
| JP | 05-275224 | | 10/1993 |
| JP | 2004-346272 | | 12/2004 |
| JP | 2007015871 | A * | 1/2007 |
| JP | 4138344 | | 8/2008 |
| JP | 5504399 | | 5/2014 |
| JP | 2016-221807 | | 12/2016 |
| JP | 2017-020539 | | 1/2017 |

OTHER PUBLICATIONS

Office Action issued in CN Patent Application No. 202080028239.3, Sep. 16, 2023, translation.
Nguyen et al., "Synthesis and magnetism of hierarchical iron oxide particles", Materials and Design, 2015, vol. 86, pp. 797-808, 3.2, Fig. 2c.
ISR issued in WIPO Patent Application No. PCT/JP2020/015761, Jun. 23, 2020, English translation.
Written Opinion issued in WIPO Patent Application No. PCT/JP2020/015761, Jun. 23, 2020, English translation.
IPRP issued in WIPO Patent Application No. PCT/JP2020/015761, Sep. 28, 2021, English translation.
Office Action issued in JP Patent Application No. 2020-059760, Nov. 15, 2023, translation.
Office Action issued in CN Patent Application No. 202080028239.3, Feb. 10, 2023, translation.
Yao Liu et al., "Spherical Co-Spinel Ferrites: Synthesis and Control Factors", Chinese Journal of Inorganic Chemistry, vol. 26, No. 4, pp. 596 to 602, partial translation and discussed in CN OA.
Liping Zhao et al., "Microwave absorption properties of $CoFe_2O_4$ hollow microspheres synthesized by modified template method", New Chemical Materials, vol. 42, No. 8, pp. 49 to 51, partial translation and discussed in CN OA.
EESR issued in EP Patent Application No. 20795461.1, May 4, 2023.
De Vicente J. et al., "Stability of Cobalt Ferrite Colloidal Particles, Effect of pH and Applied Magnetic Fields", Langmuir 2000, vol. 16, No. 21, Sep. 13, 2000, pp. 7954-7961.
Briceno Sarah et al., "Solvothermal synthesis of cobalt ferrite hollow spheres with chitosan", Material Science and Engineering C, vol. 789, Apr. 27, 2017, pp. 842-846.
Office Action issued in JP Patent Application No. 2020-059760, issued Mar. 27, 2024, translation.
Office Action issued in KR Patent Application No. 10-2021-7032752, Jan. 2, 2025, translation.
Office Action issued in JP Patent Application No. 2024-068810, Mar. 13, 2025, translation.

* cited by examiner

METHOD FOR PRODUCING COBALT FERRITE PARTICLES AND COBALT FERRITE PARTICLES PRODUCED BY SAME

TECHNICAL FIELD

The present invention relates to a method for producing cobalt ferrite particles and cobalt ferrite particles produced by the same and thus provides cobalt ferrite particles, particularly, having a relatively large average particle diameter and, furthermore, also having a narrow particle size distribution.

BACKGROUND ART

Ferrite particles are known as a highly permeable material or a permanent magnet material. Nowadays, magnetic powders have been a new material for copier toners, magnetic inks, MR fluids, and the like, and there is an expectation of improvement in quality or performance thereof.

In particular, cobalt ferrite is known as, among spinel ferrites, a magnetic material having a large crystal magnetic anisotropy and a large coercivity. In addition, cobalt is similar to iron in chemical behaviors and thus has an advantage of ease of a variety of controls in the producing process thereof.

As a method for producing ferrite particles, methods such as a co-precipitation method, a wet oxidation method and a hydrothermal method are known.

The co-precipitation method is a reaction in which two or more kinds of ions are precipitated at the same time. In the case of producing cobalt ferrite particles by the co-precipitation method, an alkali is introduced into an aqueous solution including $Fe^{3+}$ and $Co^{2+}$ ions, and then the resulting solution is heated to accelerate the reaction to thereby obtain nanosized ferrite particles. In this method, the reaction is performed at a temperature of 80° C. to 100° C., the average particle diameter of the obtained particles is approximately 20 to 50 nm, and the particle size distribution of the obtained particles is relatively wide (Patent Literature 1).

The wet oxidation method is a method in which an oxidant such as an air is reacted with a starting material aqueous solution including $Fe^{2+}$ and $Co^{2+}$ ions while being heated. In the case of using an air as the oxidant, the reaction temperature is approximately 60° C. to 100° C., and particles having a size of approximately 0.05 to 0.3 µm are obtained (Patent Literature 2 and Patent Literature 3). In a method in which a reaction between a starting material aqueous solution and an oxidant liquid is continuously performed, the reaction is performed at a temperature of 30° C. to 100° C., and ferrite particles having a size of 3 to 20 nm are obtained (Patent Literature 4).

The hydrothermal method is a method in which a mixture of an aqueous solution including $Co^{2+}$ ions and an aqueous solution including $Fe^{2+}$ ions is used for hydrothermal synthesis in an autoclave, and ferrite particles having relatively large particle diameters of 0.3 to 8 µm are produced by a reaction performed at a high temperature of 160° C. to 300° C. (Patent Literature 5).

In the case of producing ferrite particles by the conventional technique, ferrite particles can be produced at relatively low temperatures by the co-precipitation method or the wet oxidation method, but only nanometer-order fine particles are obtained. By the hydrothermal method, relatively large micrometer-order particles can be obtained, but there is a need to perform a hydrothermal reaction (Schikorr reaction) at a high temperature and a high pressure, which has a problem with facilities or costs.

RELATED ART

Patent Literature

Patent Literature 1: Japanese Patent No. 4138344
Patent Literature 2: Japanese Patent Publication No. H3-24412
Patent Literature 3: Japanese Patent Publication No. S60-47722
Patent Literature 4: Japanese Patent No. 5504399
Patent Literature 5: Japanese Patent Laid-Open No. H5-275224

SUMMARY OF INVENTION

Problem to be Solved by the Invention

The present invention overcomes the above-described problems of the related art and provides a producing method capable of synthesizing, with a lower energy, cobalt ferrite particles having a larger average particle diameter than conventional cobalt ferrite particles and having similar particle diameters. And the present invention provides cobalt ferrite particles having spherical shapes and similar particle diameters produced by the above-described method.

Solution to Problem

As means for solving the above-described problems, means having the following configurations is employed in the present invention.

(1) A method for producing cobalt ferrite particles, including performing a thermal treatment on a ferrite precursor formed of a ferrous salt and a cobalt salt in the presence of a sulfite.

(2) The method for producing cobalt ferrite particles according to (1), in which the thermal treatment of (1) is performed in a pressure vessel within a temperature range of 100° C. or higher and 190° C. or lower under a hydrothermal condition.

(3) The method for producing cobalt ferrite particles according to (1), in which the thermal treatment of (1) is performed by heating the ferrite precursor at normal pressure within a temperature range of 60° C. or higher and lower than 100° C.

(4) The method for producing cobalt ferrite particles, in which the ferrous salt and the cobalt salt in (1) are iron (II) sulfate and cobalt (II) sulfate, respectively.

(5) Cobalt ferrite particles having a spherical shape and an average particle diameter of 0.5 to 2 µm.

(6) Cobalt ferrite particles having a spherical shape and an average particle diameter of 2 to 5 µm.

(7) A copier toner containing the cobalt ferrite particles according to (5) or (6).

(8) A magnetic ink containing the cobalt ferrite particles according to (5) or (6).

(9) An MR fluid containing the cobalt ferrite particles according to (5) or (6).

(10) A white powder having the cobalt ferrite particles according to (5) or (6), wherein a titanium oxide film and a metallic silver film are provided in this order on surfaces of the cobalt ferrite particles.

(11) The white powder according to (10), having a brightness L* of 75 or higher.

Advantageous Effects of Invention

When the producing method of the present invention is employed, it is possible to produce magnetic particles of cobalt ferrite having similar particle diameters with a low energy compared with magnetic particles produced by conventional methods. In addition, the particle diameters of magnetic particles to be produced can be controlled by adding the ferrite precursor to a reaction solution in the middle of a reaction and performing the thermal treatment.

Cobalt ferrite particles obtained by the producing method of the present invention have spherical shapes and similar particle diameters and are thus expected to be used in applications of copier toners, magnetic inks, and MR fluids. In addition, the cobalt ferrite particles of the present invention can be turned into a white powder having a high brightness by whitening the cobalt ferrite particles by a known method or a powder colored with a bright color by further providing a colored layer.

DESCRIPTION OF EMBODIMENTS

Figure 1:
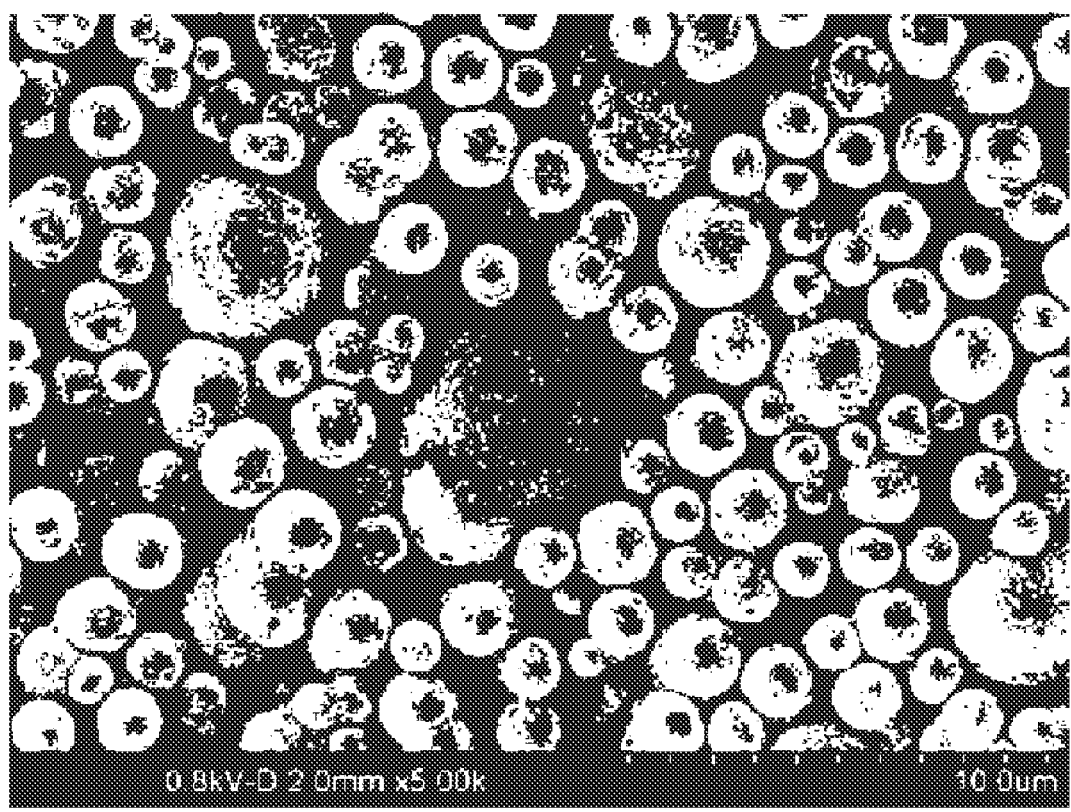
FIG. 1 is a SEM photograph of a powder sample of Example 2.

Hereinafter, a method for producing cobalt ferrite particles of the present invention will be described in a sequence of the steps.

(Production of Ferrite Precursor)

First, a ferrous salt and a cobalt salt are dissolved in deionized and deaerated water to prepare a starting material solution.

The ferrous salt that is used in the method of the present invention is not particularly limited, and examples thereof include iron (II) chloride, iron (II) sulfate and iron (II) nitrate. Iron wash waste liquid or the like from shaft furnaces or electric furnaces is also preferable as an inexpensive starting material. Iron (II) sulfate is stable as a precursor and is thus most preferable. The cobalt salt is also not particularly limited, and examples thereof include cobalt (II) chloride and cobalt (II) nitrate. For the same reason, cobalt (II) sulfate is most preferable.

Here, the reason for the use of the deionized and deaerated water is that the charge state of the metallic ions of iron and the like dissolved in the solution is prevented from being affected by a dissolved salt or oxygen. For example, it is known that, when free oxygen is present in the reaction system, divalent iron is oxidized to trivalent iron, and that fine particles having unintended particle diameters are generated.

Next, an alkali such as sodium hydroxide, potassium hydroxide, calcium hydroxide or ammonia and a sulfite are dissolved in deionized and deaerated water to prepare an alkaline aqueous solution. After that, the starting material solution and the alkaline aqueous solution are mixed together. When the starting material components are mixed together in this order, the starting material components are completely dissolved, and no cases where an unintended reaction progresses occur.

When the starting material solution and the alkaline aqueous solution are mixed together, hydroxides of the added metal elements are co-precipitated to form a gel-form precursor.

(Sulfite)

The present invention is characterized in that a thermal treatment is performed on the gel-form precursor composed of the ferrous salt and the cobalt salt in the presence of a sulfite. The inventors of the present invention consider that the sulfite has the following action on the synthesis reaction of ferrites. However, the following action of the sulfite is inferred by the inventors from the processes of a variety of reactions though the present invention is not bound to this theory.

Sulfites are generally known to have a reduction action and are used as an antioxidant for a variety of articles. On the other hand, as described above, the gel-form precursor in the present invention is formed by the co-precipitation of the hydroxides of the metal elements. In a stage before the beginning of heating, the sulfite exerts an ordinary reduction action on the gel-form precursor and prevents the oxidation of the metal hydroxides. This prevents the generation of unintended oxides other than ferrites.

It is considered that when a gel-form precursor is then heated to a high temperature, sulfite ions and sulfate ions that are generated by the oxidation of some sulfite ions exhibit an action as an oxygen supply source.

This is supported by confirming the generation of iron cobalt sulfide when a synthesis experiment of cobalt ferrite has been performed by the hydrothermal method at 180° C. This is because the generation of the metal sulfide is considered to be attributed to the fact that the sulfite ions or the sulfate ions are reduced and bonded to metal ions.

Therefore, it is considered that oxygens in the sulfite ions or the sulfate ions are also supplied to the ferrite synthesis reaction.

In such a case, it is considered that, once heating begins, sulfite gradually loses the reducing power and, conversely, acts as an oxidant. Therefore, even when the gel-form precursor is heated, it is possible to decrease the oxidation rate by heating and to increase the particle diameters of ferrite particles to be synthesized. Furthermore, ferrite particles having similar particle diameters can be produced.

The present invention has been made based on the above-described finding newly discovered by the inventors.

(Thermal Treatment)

In the present invention, two thermal treatment methods are possible. Those methods are a thermal treatment by the hydrothermal method in which a pressure vessel is used and a thermal treatment that is performed at normal pressure using a water bath.

The heating temperature is 60° C. or higher and lower than 100° C. in the case of performing the thermal treatment at normal pressure, and 100° C. or higher and at most approximately 190° C. in the case of performing the thermal treatment by the hydrothermal method. A change in the thermal treatment conditions makes it possible for cobalt ferrite particles to be generated to have different average particle diameters.

Specifically, in the case of producing cobalt ferrite particles by the hydrothermal method in which a pressure vessel is used under conditions of a high temperature and a high pressure, relatively fine particles having an average particle diameter of approximately 0.5 to 2 μm are obtained. On the other hand, in the case of producing cobalt ferrite particles by heating at normal pressure using a water bath, cobalt ferrite particles having relatively large particle diameters, and specifically an average particle diameter of approximately 2 to 5 µm are obtained.

Hereinafter, each synthesis method will be simply described.

(Hydrothermal Method)

The pressure vessel that is used in the present invention may be an ordinary high-pressure reaction container, and examples thereof include an autoclave, a pressure cooker and a boiler. An autoclave is preferable due to versatility, for example.

In the ordinary Schikorr method, a reaction is progressed at a high temperature of 200° C. or higher; however, in the present invention, magnetic particles of cobalt ferrite can be synthesized within a temperature range of 100° C. to 190° C. In the pressure vessel, an oxidation reaction progresses instead of the Schikorr reaction, which causes oxidative hydrolysis.

This can be confirmed from the following fact: in a case where the Schikorr reaction has progressed, hydrogen gas is essentially generated, whereas no hydrogen gas is generated in the present invention. Since the generation of the sulfide is confirmed as described above, it is considered that an oxidation reaction in which the sulfite ions serves as an oxidant occurs.

The obtained magnetic particles are collected by washing to remove a non-magnetic by-product.

(Normal Pressure Method)

The gel-form precursor obtained in the previous step is put into a container, immersed in a water bath maintained at 60° C. to 100° C., and thermally treated. The gel-form precursor is maintained for approximately 48 hours in this state to perform a gradual synthesis reaction of cobalt ferrite. It is considered that the same oxidation reaction as in the hydrothermal method progresses.

The obtained product is washed, then, dried in the atmosphere, and thermally treated, thereby producing magnetic particles.

(Cobalt Ferrite Particles)

The cobalt ferrite particles produced by the present invention are relatively large particles having a micrometer-order average particle diameter. In addition, since the cobalt ferrite particles each have a shape close to a spherical shape and have a narrow width of the particle size distribution, the cohesive property between the particles is weak, and the cobalt ferrite particles can be closely packed when molded, which makes it possible to improve the magnetic characteristics of a molded article or makes it possible to increase the bulk density.

Therefore, when used in applications of copier toners, magnetic inks, and MR fluids, the cobalt ferrite particles are capable of sufficiently exhibiting the characteristics.

(White Powder)

The cobalt ferrite particles of the present invention can be made into a white powder by whitening or can be made into a colored powder by being whitened and then further provided with a colored layer.

The cobalt ferrite particles can be whitened by a known method, but are desirably whitened by, for example, a whitening method (Japanese Patent No. 4113045), which is patented by the present applicants.

This whitening method is a method for whitening powder by providing a titanium oxide film between a base particle and a metallic silver film. Specifically, the cobalt ferrite particles can be whitened by forming a titanium oxide film on the surface of the base particle by the hydrolysis of a titanium alkoxide (for example, International Publication No. WO 96/28269), a reaction from a titanium salt aqueous solution (for example, Japanese Patent Laid-Open No. 11-131102), or the like and then forming a metallic silver film by a known method such as an electroless plating method.

This method makes it possible to produce a white powder having a titanium oxide film and a metallic silver film in this order on the surface of the cobalt ferrite particle of the present invention and makes it possible to improve the brightness L* to 75 or higher.

EXAMPLES

Hereinafter, the present invention will be described in more detail by way of examples, but the present invention is not limited to these examples.

The average particle diameters and particle size distributions of cobalt ferrite particles produced in the examples were determined by the following methods.

(Average Particle Diameter)

The average particle diameter was determined as follows.

An image in which a grid composed of 16 vertical lines and 16 horizontal lines evenly disposed was drawn on a SEM image of a powder sample was printed, the diameters of a total of 256 particles that were on intersections of the vertical lines and the horizontal lines or closest to the intersections were measured with a caliper, and the average value thereof was obtained. In addition, the length of a scale bar on the SEM image was measured, and the particle diameters obtained in the unit of millimeters were converted to the particle diameters in the unit of micrometers using the value of the length of the scale bar. The result was used as the average particle diameter.

(Particle Size Distribution)

Whether the cobalt ferrite particles of the present invention have similar particle diameters was determined with a CV value, which is a coefficient of variation of the particle diameters.

Specifically, statistically, the standard deviation is used as one of measure for variations in data distribution; however, currently, the standard deviation is standardized by dividing it by the arithmetic average value of the data to evaluate a variation in data. This is the CV value, which is a coefficient of variation, and, in the present invention as well, the CV value is used to evaluate the fact that the particle diameters of the formed cobalt ferrite particles vary to a small extent. A small CV value indicates that the variation in the particle size distribution is small. Particularly, particles having a CV value of 0.1 or less are considered as monodisperse particles, and the characteristics thereof are attracting attention.

[Example 1] Thermal Treatment I by Normal Pressure Method (1) Preparation of Deionized and Deaerated Water 480 g of deionized water was deaerated with 2.5 L/min of $N_2$ for 30 minutes to prepare deionized and deaerated water.

(2) Preparation of Starting Material Aqueous Solution 45 g of ferrous sulfate heptahydrate ($FeSO_4 \cdot 7H_2O$) and 9 g of cobalt sulfate heptahydrate ($CoSO_4 \cdot 7H_2O$) were dissolved in 118 g of the deionized and deaerated water to prepare a starting material aqueous solution.

(3) Preparation of Alkaline Aqueous Solution 14 g of sodium hydroxide (NaOH) and 50 g of sodium sulfite ($Na_2SO_3$) were dissolved in 240 g of the deionized and deaerated water to prepare an alkaline aqueous solution.

(4) Preparation of Gel-Form Precursor

The starting material aqueous solution and the alkaline aqueous solution were mixed together in a $N_2$-purged container and stirred for five minutes, thereby preparing a gel-form precursor.

(5) Preparation of Poorly Magnetic Particles by Thermal Treatment of Gel-Form Precursor The gel-form precursor was put into the $N_2$-purged container and immersed in a water bath at 60° C. for 20 days to be thermally treated, thereby preparing poorly magnetic particles.

(6) Washing of Poorly Magnetic Particles

The poorly magnetic particles were filtered, washed with passing water, and dispersed in 4 L of deionized water at 80° C., and the dispersion was stirred for 24 hours. After that, the poorly magnetic particles were dispersed in 1 L of deionized water having a pH from 2.5 to 3 adjusted with 1:1 sulfuric acid, and the dispersion was irradiated with ultrasonic waves under stirring. Then, the dispersion was separated into solid and liquid using a magnet, thereby removing a non-magnetic by-product.

(7) Drying of poorly magnetic particles

The washed poorly magnetic particles were dried at 110° C. in the atmosphere for two hours.

(8) Thermal treatment of poorly magnetic particles

The dried poorly magnetic particles were thermally treated at 600° C. in a $N_2$ atmosphere for three hours, thereby obtaining magnetic particles.

[Example 2] Thermal Treatment II by Normal Pressure Method

Magnetic particles were prepared by the same method as in Example 1 except that, in the thermal treatment of the gel-form precursor in Example 1, the gel-form precursor was immersed in the water bath at 90° C. for 48 hours and thermally treated.

Comparative Example 1

Magnetic particles were prepared by the same method as in Example 1 except that, in the thermal treatment of the gel-form precursor in Example 1, the gel-form precursor was immersed in a water bath at 30° C. and thermally treated.

Comparative Example 2

Magnetic particles were prepared by the same method as in Example 2 except that, in the thermal treatment of the gel-form precursor in Example 2, the sodium sulfite was not used.

[Example 3] Thermal Treatment I by Hydrothermal Synthesis Method (1) Preparation of Deionized and Deaerated Water 480 g of deionized water was deaerated with 2.5 L/min of $N_2$ for 30 minutes to prepare deionized and deaerated water.

(2) Preparation of Starting Material Aqueous Solution 45 g of ferrous sulfate heptahydrate ($FeSO_4 \cdot 7H_2O$) and 9 g of cobalt sulfate heptahydrate ($CoSO_4 \cdot 7H_2O$) were dissolved in 118 g of the deionized and deaerated water to prepare a starting material aqueous solution.

(3) Preparation of Alkaline Aqueous Solution 14 g of sodium hydroxide (NaOH) and 50 g of sodium sulfite ($Na_2SO_3$) were dissolved in 240 g of the deionized and deaerated water to prepare an alkaline aqueous solution.

(4) Preparation of Gel-Form Precursor

The starting material aqueous solution and the alkaline aqueous solution were mixed together in a $N_2$-purged container and stirred for five minutes, thereby preparing a gel-form precursor.

(5) Preparation of Magnetic Particles by Hydrothermal Treatment of Gel-Form Precursor The gel-form precursor was put into a $N_2$-purged autoclave and hydrothermally treated at 100° C. for 20 hours under stirring, thereby obtaining magnetic particles.

(6) Washing of Magnetic Particles

The magnetic particles were filtered, washed with passing water, and dispersed in 4 L deionized water at 80° C., and the dispersion was stirred for 24 hours. After that, the magnetic particles were dispersed in 1 L deionized water having a pH from 2.5 to 3 adjusted with 1:1 sulfuric acid, and the dispersion was irradiated with ultrasonic waves under stirring. Then, the dispersion was separated into solid and liquid using a magnet, thereby removing a non-magnetic by-product.

(7) Drying of Magnetic Particles

The washed magnetic particles were dried at 110° C. in the atmosphere for two hours.

[Example 4] Thermal Treatment II by Hydrothermal Synthesis Method

Magnetic particles were prepared by the same method as in Example 3 except that, in the hydrothermal treatment of the gel-form precursor in Example 3, the hydrothermal treatment was performed at 190° C. for four hours.

Comparative Example 3

Magnetic particles were prepared by the same method as in Example 4 except that, in the hydrothermal treatment of the gel-form precursor in Example 4, the sodium sulfite was not used.

A variety of characteristics of the magnetic particles produced in Examples 1 to 4 and Comparative Examples 1 to 3 are as shown in Table 1 below.

TABLE 1

| | Comparative Example 1 | Example 1 | Example 2 | Comparative Example 2 | Example 3 | Example 4 | Comparative Example 3 |
|---|---|---|---|---|---|---|---|
| Mode of reaction | Normal pressure method | Normal pressure method | Normal pressure method | Normal pressure method | Hydrothermal method | Hydrothermal method | Hydrothermal method |
| Reaction temperature (° C.) | 30 | 60 | 90 | 90 | 100 | 190 | 190 |

TABLE 1-continued

| | Comparative Example 1 | Example 1 | Example 2 | Comparative Example 2 | Example 3 | Example 4 | Comparative Example 3 |
|---|---|---|---|---|---|---|---|
| Sulfite | Used | Used | Used | Not Used | Used | Used | Not Used |
| Average particle diameter (μm) | N/A | 2.33 | 2.15 | 0.48 | 1.64 | 1.09 | 0.47 |
| Standard deviation (μm) | N/A | 1.59 | 0.81 | 0.26 | 0.63 | 0.38 | 0.15 |
| CV value | N/A | 0.68 | 0.38 | 0.53 | 0.38 | 0.35 | 0.32 |

The cobalt ferrite particles of Examples 1 to 4, which were produced under the producing conditions that are employed in the producing method of the present invention, were ferrite particles having a large average particle diameter. On the other hand, in the case of attempting to produce cobalt ferrite particles under the conditions of Comparative Example 1, ferrite particles were not generated, and, under the conditions of Comparative Examples 2 and 3, only particles having a small average particle diameter were obtained. The CV values of the particles of Examples 1 to 4 were almost the same as those of Comparative Examples 1 to 3.

When observed with a SEM, the shapes of the produced ferrite particles are as shown in FIG. 1 to FIG. 4.

Figure 2:
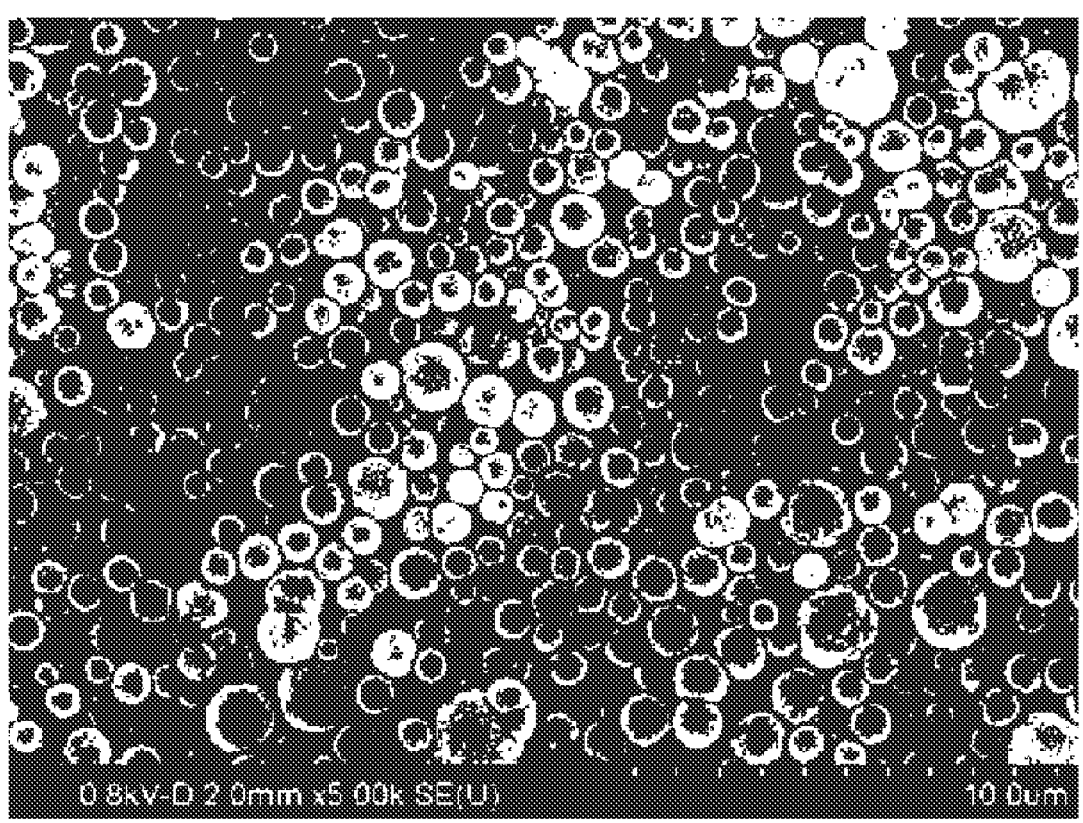
FIG. 2 is a SEM photograph of a powder sample of Example 4.

FIG. 1 is a SEM image of the powder sample of Example 2 and shows ferrite particles obtained by a thermal treatment at normal pressure which corresponds to claim 3. FIG. 2 is a SEM image of the powder sample of Example 4 and shows ferrite particles obtained by a thermal treatment under hydrothermal conditions which corresponds to claim 2. It is found that all of the powder samples have spherical shapes.

Figure 3:
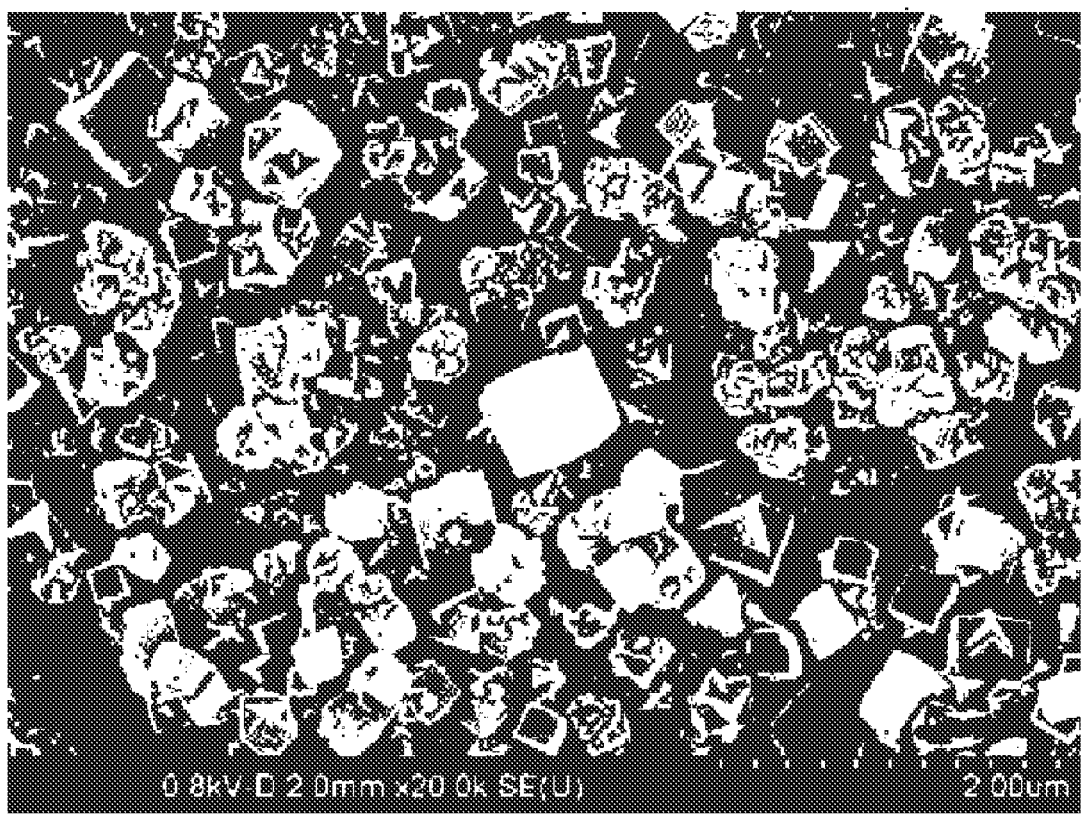
FIG. 3 is a SEM photograph of a powder sample of Comparative Example 2.
Figure 4:
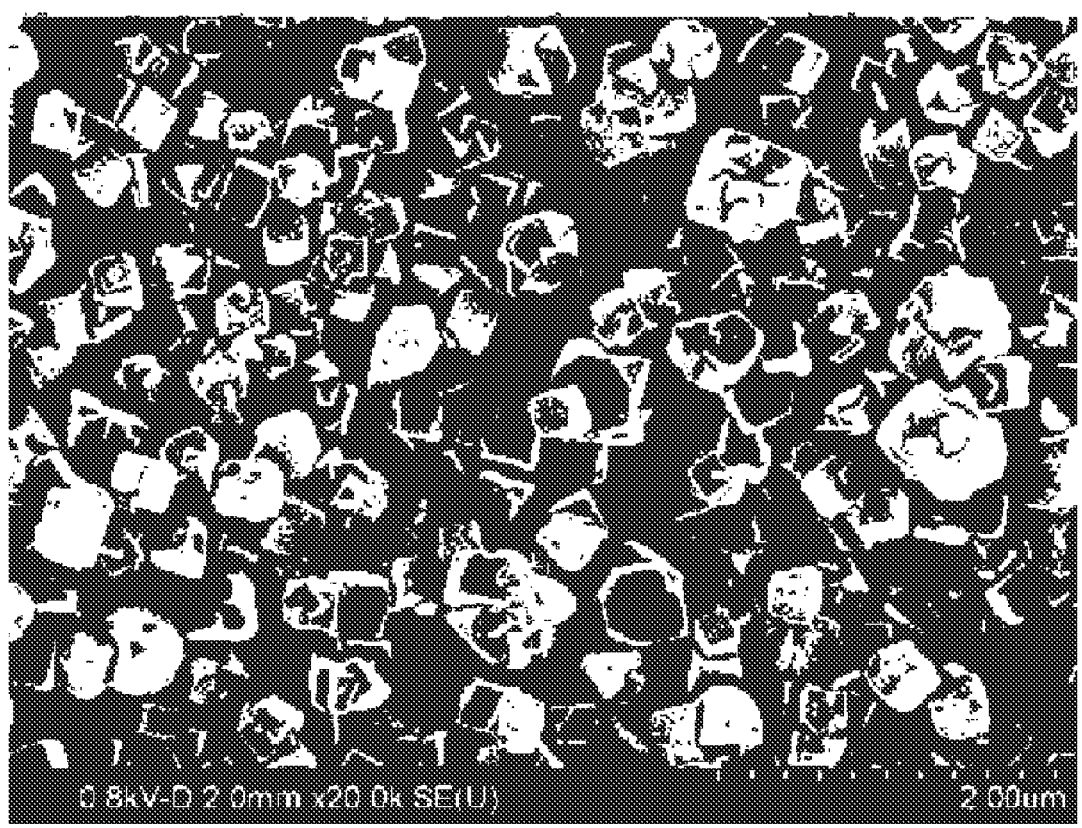
FIG. 4 is a SEM photograph of a powder sample of Comparative Example 3.

On the other hand, FIG. 3 and FIG. 4 are SEM images of the powder samples of Comparative Examples 2 and 3, which are all ferrite particles obtained by a thermal treatment under a condition where no sulfite was present. It is found that the ferrite particles are all particles having a cubic shape and ferrite particles that are totally different from those in the examples.

From the results of these examples and comparative examples, technical meanings of the presence of a sulfite and setting of appropriate producing conditions corresponding thereto are evident.

Example 5

2.2 mL of a titanium tetrachloride solution (16.0 to 17.0% in terms of Ti), 5.84 g of aqueous ammonia, and 10.0 g of hydrogen peroxide water were mixed with 19.8 g of deionized water to prepare a yellow transparent peroxotitanic acid solution. 9.92 g of boric anhydride, 11.72 g of potassium chloride, and 2.55 g of sodium hydroxide were dissolved in 535.81 g of deionized water, and 16.75 g of the ferrite particles obtained in Example 2 were suspended therein. The peroxotitanic acid solution was dropped into and mixed with the suspension while the suspension is stirred, and then suspended solids were dried, thereby obtaining a titanium oxide film-coated powder.

4.78 g of glucose, 0.48 g of tartaric acid, and 8.50 g of ethanol were dissolved in 106.24 g of deionized water to prepare a reduction liquid. 5 g of sodium hydroxide, 7.00 g of silver nitrate, and 12.00 g of aqueous ammonia were mixed with 360 g of deionized water to prepare a silver ammine complex solution, and 10.40 g of the titanium oxide-coated powder was suspended in the silver ammine complex solution. The reduction liquid was mixed with the suspension while the suspension is irradiated with ultrasonic waves, and the suspended solids were dried, thereby obtaining a silver film-coated powder. The obtained white powder had a brightness L* of 78.62.

INDUSTRIAL APPLICABILITY

Cobalt ferrite particles obtained by the producing method of the present invention have spherical shapes and similar particle diameters and are thus expected to be used in applications of copier toners, magnetic inks, and MR fluids.

The invention claimed is:

1. A method for producing cobalt ferrite particles, comprising:
    performing a thermal treatment on a ferrite precursor formed of a ferrous salt and a cobalt salt in the presence of a sulfite, wherein the thermal treatment is
        performed in a pressure vessel within a temperature range of 100° C. or higher and 190° C. or lower under a hydrothermal condition, and the resulting cobalt ferrite particles have an average particle diameter of 0.5 to 2 μm, or
        performed by heating the ferrite precursor at normal pressure within a temperature range of 60° C. or higher and lower than 100° C., and the resulting cobalt ferrite particles have an average particle diameter of 2 to 5 μm;
    wherein the cobalt ferrite particles have non-hollow spherical shapes; and
    wherein the cobalt ferrite particles have a CV value of 0.3 to 0.7.

2. The method for producing cobalt ferrite particles according to claim 1, wherein the ferrous salt and the cobalt salt are iron (II) sulfate and cobalt (II) sulfate, respectively.

3. A method for producing a white powder, comprising providing a titanium oxide film and a metallic silver film in this order on surfaces of the cobalt ferrite particles according to claim 1.

4. The method for producing a white powder according to claim 3, wherein the white powder has a brightness L* of 75 or higher.

5. The method for producing cobalt ferrite particles according to claim 1,
    wherein a titanium oxide film and a metallic silver film are provided in this order on surfaces of the cobalt ferrite particles.

6. The method for producing cobalt ferrite particles according to claim 5, wherein the cobalt ferrite particles have a brightness L* of 75 or higher.

* * * * *